(12) United States Patent
Van Der Hoek et al.

(10) Patent No.: US 10,809,119 B2
(45) Date of Patent: Oct. 20, 2020

(54) SCALES FOR WEIGHING PIGLETS

(71) Applicant: LeeO precision farming B.V., Deventer (NL)

(72) Inventors: Arie Jan Van Der Hoek, Hoofddorp (NL); Hans Bekking, Ulft (NL)

(73) Assignee: LeeO precision farming B.V., Deventer (NL)

(*) Notice: Subject to any disclaimer, the term of this patent is extended or adjusted under 35 U.S.C. 154(b) by 145 days.

(21) Appl. No.: 16/082,744

(22) PCT Filed: Mar. 6, 2017

(86) PCT No.: PCT/EP2017/055170
§ 371 (c)(1),
(2) Date: Sep. 6, 2018

(87) PCT Pub. No.: WO2017/153326
PCT Pub. Date: Sep. 14, 2017

(65) Prior Publication Data
US 2019/0041253 A1    Feb. 7, 2019

(30) Foreign Application Priority Data
Mar. 7, 2016  (EP) .................................. 16158983

(51) Int. Cl.
*G01G 17/08*     (2006.01)
*G01G 21/22*     (2006.01)
*G01G 23/12*     (2006.01)
*A01K 29/00*     (2006.01)

(52) U.S. Cl.
CPC ............. *G01G 17/08* (2013.01); *A01K 29/00* (2013.01); *G01G 21/22* (2013.01); *G01G 23/12* (2013.01)

(58) Field of Classification Search
CPC ........ G01G 17/08; G01G 21/23; G01G 23/12; A01K 29/00
See application file for complete search history.

(56) References Cited

U.S. PATENT DOCUMENTS

| | | | | | |
|---|---|---|---|---|---|
| 3,630,299 | A | * | 12/1971 | Albagli ................. | G01G 19/44 177/145 |
| 4,126,197 | A | * | 11/1978 | Kechely ................ | G01G 19/44 177/126 |
| 4,286,679 | A | * | 9/1981 | Schneider ............. | G01G 17/08 177/132 |
| 4,905,780 | A | * | 3/1990 | Goff, III ............... | G01G 17/08 177/136 |
| 7,184,822 | B2 | | 2/2007 | Kasahara et al. | |

FOREIGN PATENT DOCUMENTS

| | | |
|---|---|---|
| CN | 202420636 U | 9/2012 |
| CN | 204649291 U | 9/2015 |
| EP | 1452132 A2 | 9/2004 |

* cited by examiner

*Primary Examiner* — Randy W Gibson
(74) *Attorney, Agent, or Firm* — The Webb Law Firm

(57) ABSTRACT

The invention relates to scales for weighing piglets, including a base frame; at least one weighing element arranged on the base frame; and a weigh platform arranged on the at least one weighing element, wherein the weighing platform is elongate, wherein the top surface of the weighing platform is arranged at a distance above the base and wherein the width of the elongate top surface is at least half of the width of the base in order to provide space for the legs of a piglet when supported on the belly by the elongate top surface.

20 Claims, 2 Drawing Sheets

SCALES FOR WEIGHING PIGLETS

CROSS-REFERENCE TO RELATED APPLICATIONS

This application is the United States national phase of International Application No. PCT/EP2017/055170 filed Mar. 6, 2017, and claims priority to European Patent Application No. 16158983.3 filed Mar. 7, 2016, the disclosures of which are hereby incorporated in their entirety by reference.

BACKGROUND OF THE INVENTION

Field of the Invention

The invention relates to scales for weighing piglets, including a base frame; at least one weighing element arranged on the base frame; and a weigh platform arranged on the at least one weighing element.

Description of Related Art

When breeding pigs, it is necessary to weigh the piglets in order to monitor their growth. These measurements are stored in a database, together with other data, such as the amount of food they get and any possible medication administered to the piglets. This allows for a breeder to follow the health and well being of each individual pig from birth up to the end of the life of a pig.

Currently, the weighing of piglets takes a substantial amount of time, as a piglet needs to stand still when placed on a scale in order to obtain a reliable measurement. When the piglet is placed on its feet on the weighing platform, the piglet will start to walk, as the piglet typically wants to return to a place where it is more comfortable. Getting the piglet to calm down and to stay still will take at least some time, slowing down the weighing process.

Accordingly, it is an object of the invention to provide scales for weighing piglets, in which the above mentioned disadvantages are reduced and with which the weighing process of piglets can be speeded up.

SUMMARY OF THE INVENTION

This object is achieved according to the invention with scales for weighing piglets, including a base frame; at least one weighing element arranged on the base frame; and a weigh platform arranged on the at least one weighing element, wherein in that the weighing platform is elongate, wherein the top surface of the weighing platform is arranged at a distance above the base and wherein the width of the elongate top surface is less than half of the width of the base in order to provide space for the legs of a piglet when supported on the belly by the elongate top surface.

It has been found by the applicant, that when a piglet is held on its belly, then the piglet will almost instantly calm down. So, the scales according to the invention are provided with a weighing platform, which is elongate, such that the top surface can run between the legs of the piglet along the belly. By ensuring that the width of the top surface is less than half of the width of the base, a stable scale is provided, although the top surface is positioned at a distance from the base. This allows for the piglet to lie with its belly on the elongate top surface and with its legs on either side of the top surface hanging down, without touching the base.

As the piglet instantly calms down in this position, the piglet can quickly be weighed, speeding up the weighing process and allowing for a large number of piglets to be weighed in a small amount of time.

In a preferred embodiment of the scales according to the invention the length of the top surface of the weighing platform is at least five times the width of the top surface. With this ratio between length and width of the top surface, a reliable top surface is provided to support piglets on their belly.

Preferably, the width of the top surface is less than 70 millimeter, preferably less than 60 millimeter and wherein the length of the top surface is more than 400 millimeter, preferably more than 450 millimeter In another embodiment of the scales according to the invention weighing platform comprises a bend plate, having a U-shaped cross-section.

The U-shaped bend plate provides a simple and cost effective embodiment for the weighing platform, ensuring that a piglet is sufficiently supported on the belly, that the legs can hang down on both sides of the U-shaped plate and that the piglet cannot be injured, while weighing the piglet.

In yet another preferred embodiment of the scales according to the invention, the weighing platform comprises two side walls arranged at a distance from the top surface of the weighing platform, which side walls extend perpendicular to the top surface and wherein the distance between the two side walls and the top surface provides space between the top surface and the two side walls for the legs of a piglet when supported on the belly by the elongate top surface.

With the side walls on both sides of the top surface, a piglet will be confined between the two side walls and the top surface and it is ensured that the piglet cannot fall off the weighing platform, if the piglet would make unexpected movements.

In a further preferred embodiment of the scales according to the invention the weighing platform has a substantially W-shaped cross-section and the elongate top surface is provided by the center wave crest of the W-shaped cross-section.

This W-shape provides for a top surface for the piglet to lie on and for upstanding side walls, confining the piglet on both sides, while the legs of the piglet can hang down freely.

In yet another embodiment of the scales according to the invention the at least one weighing element comprises a load cell. A load cell provides an electric signal related to the weight exerted on the load cell. This electric signal can easily be used by a controller to calculate the weight of the piglet and to store the weighing data in a database.

BRIEF DESCRIPTION OF THE DRAWINGS

These and other features of the invention will be elucidated in conjunction with the accompanying drawings.

DESCRIPTION OF THE INVENTION

Figure 1:
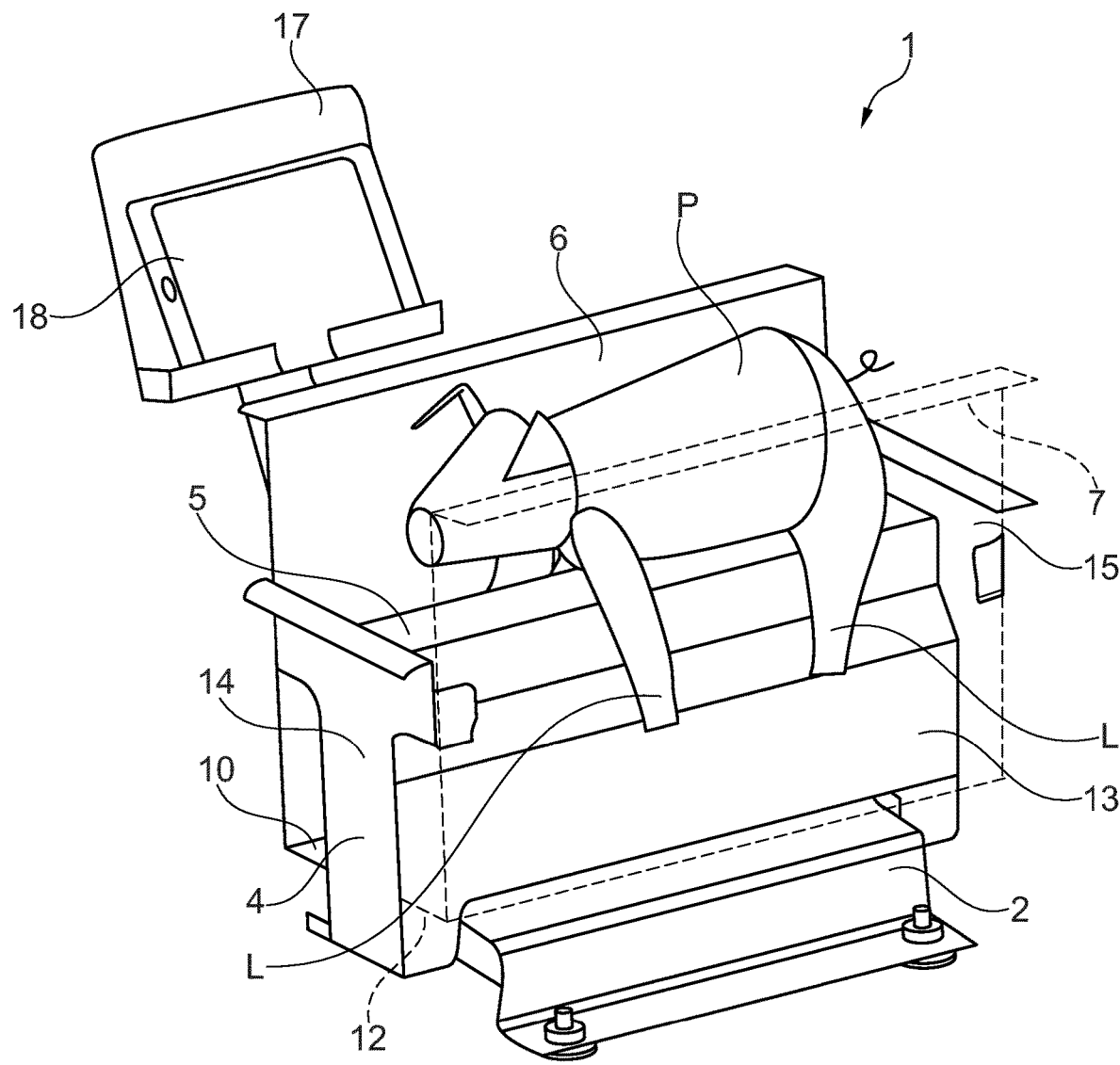
FIG. 1 shows a perspective view of an embodiment of a scale for weighing piglets according to the invention.
Figure 2:
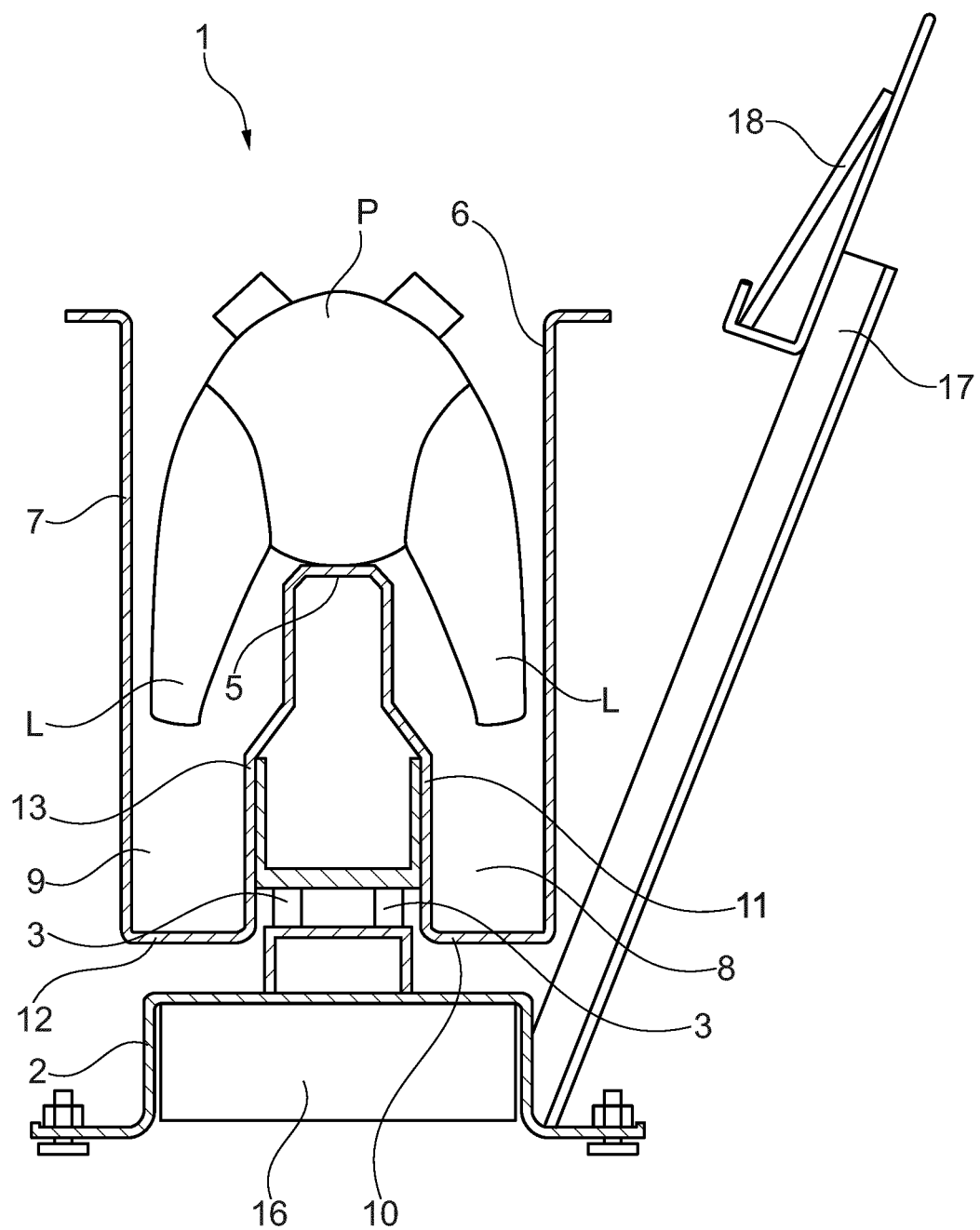
FIG. 2 shows a cross-sectional view of the scale of FIG. 1.

FIG. 1 shows scales 1 for weighing piglets according to the invention. The scales 1 has a base frame 2, on which load cells 3 (see FIG. 2) are arranged. On top of the load cells 3, a weigh platform 4 is arranged. The weigh platform 4 is in cross-section W-shaped.

The center wave crest of the W-shaped cross-section provides an elongate top surface 5. A piglet P lies with its belly on this elongate top surface 5, while the legs L of the piglet hang down on both sides of the elongate top surface. This position ensures that the piglet P keeps calm and the weight can be measured via the load cells 3.

Two side walls 6, 7 are arranged on both sides and at a distance of the top surface 5, such that a space 8, 9 is provided in which the legs L of the piglet P can hang down. The two side walls 6, 7 are connected via intermediate walls 10, 11, 12, 13 to the top surface 5, on which the piglet P lies. Worded differently, the walls of the weigh platform 5 are fixed to one another. Also, the elongate top surface 5 is at a fixed distance from walls 10, 12. Front wall 14 and end wall 15 provide for a further enclosure of the piglet P and more rigidity.

A controller 16 is arranged underneath the base frame 2, which controller 16 converts the signals of the load cells 3 and converts these signals into a weight of the piglet P. The controller 16 can also comprise a power adapter to provide power to devices, for example used for identifying the piglets P and entering data.

The scales 1 furthermore provide a stand 17 on which a table 18 or the like can be placed.

The invention claimed is:

1. A scale for weighing piglets, comprising:
   a base frame;
   at least one weighing element arranged on the base frame; and
   a weigh platform arranged on the at least one weighing element;
   wherein the weighing platform is elongate, wherein the top surface of the weighing platform is arranged at a distance above the base and wherein the width of the elongate top surface is less than half of the width of the base in order to provide space for the legs of a piglet when supported on the belly by the elongate top surface; and
   wherein the weigh platform further comprises two side walls, a front wall and an end wall to provide an enclosure for a piglet and wherein the entire weighing platform rests upon the at least one weighing element.

2. The scale according to claim 1, wherein the length of the top surface of the weighing platform is at least five times the width of the top surface.

3. The scale according to claim 1, wherein the width of the top surface is less than 70 millimeters, and wherein the length of the top surface is more than 400 millimeters.

4. The scale according to claim 1, wherein the weighing platform comprises a bend plate having a U-shaped cross-section.

5. The scale according to claim 1, wherein the two side walls are arranged at a distance from the top surface of the weighing platform, which side walls extend perpendicular to the top surface, and wherein the distance between the two side walls and the top surface provides space between the top surface and the two side walls for the legs of a piglet when supported on the belly by the elongate top surface.

6. The scale according to claim 5, wherein the weighing platform has a substantially W-shaped cross-section and wherein the elongate top surface is provided by the center wave crest of the W-shaped cross-section.

7. The scale according to claim 1, wherein the at least one weighing element comprises a load cell.

8. The scale according to claim 2, wherein the width of the top surface is less than 70 millimeters and wherein the length of the top surface is more than 400 millimeters.

9. The scale according to claim 2, wherein the weighing platform comprises a bend plate having a U-shaped cross-section.

10. The scale according to claim 3, wherein the weighing platform comprises a bend plate having a U-shaped cross-section.

11. The scale according to claim 8, wherein the weighing platform comprises a bend plate having a U-shaped cross-section.

12. The scale according to claim 2, wherein the two side walls are arranged at a distance from the top surface of the weighing platform, which side walls extend perpendicular to the top surface, and wherein the distance between the two side walls and the top surface provides space between the top surface and the two side walls for the legs of a piglet when supported on the belly by the elongate top surface.

13. The scale according to claim 3, wherein the two side walls are arranged at a distance from the top surface of the weighing platform, which side walls extend perpendicular to the top surface, and wherein the distance between the two side walls and the top surface provides space between the top surface and the two side walls for the legs of a piglet when supported on the belly by the elongate top surface.

14. The scale according to claim 4, wherein the weighing two side walls are arranged at a distance from the top surface of the platform, which side walls extend perpendicular to the top surface, and wherein the distance between the two side walls and the top surface provides space between the top surface and the two side walls for the legs of a piglet when supported on the belly by the elongate top surface.

15. The scale according to claim 8, wherein the two side walls are arranged at a distance from the top surface of the weighing platform, which side walls extend perpendicular to the top surface, and wherein the distance between the two side walls and the top surface provides space between the top surface and the two side walls for the legs of a piglet when supported on the belly by the elongate top surface.

16. The scale according to claim 12, wherein the weighing platform has a substantially W-shaped cross-section and wherein the elongate top surface is provided by the center wave crest of the W-shaped cross-section.

17. The scale according to claim 13, wherein the weighing platform has a substantially W-shaped cross-section and wherein the elongate top surface is provided by the center wave crest of the W-shaped cross-section.

18. The scale according to claim 14, wherein the weighing platform has a substantially W-shaped cross-section and wherein the elongate top surface is provided by the center wave crest of the W-shaped cross-section.

19. The scale according to claim 15, wherein the weighing platform has a substantially W-shaped cross-section and wherein the elongate top surface is provided by the center wave crest of the W-shaped cross-section.

20. The scale according to claim 1, wherein the elongate top surface is at a fixed distance from the bottom wall and wherein the walls of the weigh platform are fixed to one another to provide rigidity.

* * * * *

UNITED STATES PATENT AND TRADEMARK OFFICE
CERTIFICATE OF CORRECTION

PATENT NO. : 10,809,119 B2
APPLICATION NO. : 16/082744
DATED : October 20, 2020
INVENTOR(S) : Arie Jan van der Hoek et al.

It is certified that error appears in the above-identified patent and that said Letters Patent is hereby corrected as shown below:

In the Claims

Column 3, Line 44, Claim 3, delete "millimeters," and insert -- millimeters --

Column 4, Line 27, Claim 14, after "wherein the" delete "weighing"

Column 4, Line 29, Claim 14, delete "platform," and insert -- weighing platform, --

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*